Patented Jan. 1, 1924.

1,479,533

UNITED STATES PATENT OFFICE.

FRANK B. COONEY, OF MINNEAPOLIS, MINNESOTA.

INK PASTE.

No Drawing.   Application filed June 9, 1922.   Serial No. 567,168.

*To all whom it may concern:*

Be it known that I, FRANK B. COONEY, a citizen of the United States, residing at Minneapolis, in the county of Hennepin and State of Minnesota, have invented certain new and useful Improvements in Ink Paste, of which the following is a specification.

This invention relates to an ink product in the form of paste.

The primary object of this invention is the compounding of an ink which may be vended in paste form and rendered fluid for use by the addition of water, so that a very satisfactory writing fluid is provided free of suspended matter and other imperfections.

An important object of this invention is the provision of an ink product in the form of paste, which may be vended in collapsible tubes, the same being a highly concentrated ink body which must be diluted to make the same fluid for writing purposes.

A further object of the invention is the provision of an ink product of the above character, which by reason of the compact manner in which the same is manufactured and vended, will be of relatively low cost, due to the concentrated form of the same, compact arrangement, and low shipping cost.

Other objects and advantages of this invention will be apparent during the course of the following description.

It is preferred that the improved ink paste material be compounded of the following ingredients and proportions:

| | | |
|---|---|---|
| Cold water | 2 | ounces. |
| White potato dextrin | 1 | ounce. |
| Gallic acid powdered C. P. | 336 | grains. |
| Ferrous sulphate granulated C. P. | 252 | grains. |
| Hydrochloric acid (18%) | 130 | minims. |
| Carbolic acid (90%) | 1½ | drachms. |
| Pure glycerine | 2 | drachms. |
| Blue aniline A | 217 | grains. |
| Indigotin | 68 | grains. |

The improved ink composition is specially prepared by the following process:—

Mix 2 ounces of cold water with 1 ounce of white potato dextrin, heating the same slowly in a double boiler until the same has attained a temperature of 172° F. This mixture must be stirred constantly and extreme care taken that the temperature is not exceeded. This mixture is then permitted to cool to a temperature of 80 or 85° F. at which temperature the mixture is held while slowly adding the following ingredients in the proportions listed:—

| | | |
|---|---|---|
| Gallic acid (powdered) | 336 | grains. |
| Ferrous sulphate (granulated) C. P. | 252 | grains. |
| Hydrochloric acid (18%) | 130 | minims. |
| Carbolic acid (90%) | 1½ | drachms. |
| Pure glycerine | 2 | drachms. |
| Blue aniline A | 217 | grains. |
| Indigotin | 68 | grains. |

Each of the above ingredients must be separately and slowly added, while constantly stirring the heated mixture, in order that the ingredients may be thoroughly associated and compounded at the temperature of between 80 and 85° F. It is absolutely necessary that this temperature be held during mixing of the ingredients. After the ingredients have been thoroughly mixed, the temperature of the composition may be raised to 95° F. After the proper association of the ingredients at the last mentioned temperature, the mixture is poured in its viscid condition into collapsible lead tubes and permitting to stand twenty-four hours before sealing said tubes. The above specified ingredients and their proportions will produce four fluid ounces of the resultant ink paste, which amount is sufficient for one gallon of ink after dilution.

Blue aniline A herein mentioned, is to be understood as referring to sodium salts of trisulpotriphenylpararosaniline and trisulpotriphenylrosaniline.

The above formula is given with the assumption that the water used therein contains considerable alkaline matter. Where water is used in the compounding of the improved ink, which contains but little alkaline matter, acetic acid may be added to the amount desired.

The resultant product forms a paste within the collapsible vending tube, and is of course, a highly concentrated ink body, which may readily dissolve in hot or cold water, when it is desired to use the same for writing purposes.

From the foregoing, it can be seen that an ink composition in paste form has been provided, which possesses many advantages, chiefly low cost of production, shipping, and storing. When prepared for writing purposes, the fluid is absolutely free of suspended matter and is a perfect writing fluid. The paste form of ink is superior to other forms of concentrated ink, such as powders or tablets, not alone due to the fact that the same is easily handled, but due to the ease of mixing to prepare the final writing fluid.

Various changes in the ingredients and proportions thereof may be made to the improved ink product, as well as alterations to the process of making the same, without departing from the spirit of the invention, or the scope of the claims.

I claim:

1. An ink in the form of paste comprising water, white potato dextrin, gallic acid, ferrous sulphate, hydrochloric acid, carbolic acid, glycerine, and coloring matter.

2. An ink in the form of paste comprising water, white potato dextrin, gallic acid, ferrous sulphate, hydrochloric acid, carbolic acid, glycerine, coloring matter, and acetic acid.

3. An ink in the form of paste comprising water, a relatively large quantity of viscid matter, gallic acid, ferrous sulphate, hydrochloric acid, carbolic acid and coloring matter.

4. An ink in the form of paste comprising cold water, white potato dextrin, powdered gallic acid, granulated ferrous sulphate, hydrochloric acid, carbolic acid, pure glycerine, blue aniline A, and indigotin.

5. An ink in the form of paste comprising cold water, white potato dextrin, powdered gallic acid, granulated ferrous sulphate, carbolic acid, pure glycerine, blue aniline A, indigotin, and acetic acid.

6. An ink in paste form comprising the following ingredients and their respective proportions:—

| | |
|---|---|
| Cold water | 2 ounces. |
| White potato dextrin | 1 ounce. |
| Powdered gallic acid | 336 grains. |
| Granulated ferrous sulphate | 252 grains. |
| Hydrochloric acid (18%) | 130 minims. |
| Carbolic acid (90%) | 1½ drachms. |
| Pure glycerine | 2 drachms. |
| Blue aniline A | 217 grains. |
| Indigotin | 68 grains. |

7. An ink in the form of paste comprising the following ingredients and their respective proportions:—

| | |
|---|---|
| Cold water | 2 ounces. |
| White potato dextrin | 1 ounce. |
| Powdered gallic acid | 336 grains. |
| Granulated ferrous sulphate | 252 grains. |
| Hydrochloric acid (18%) | 130 minims. |
| Carbolic acid (90%) | 1½ drachms. |
| Pure glycerine | 2 drachms. |
| Blue aniline A | 217 grains. |
| Indigotin | 68 grains. |
| Acetic acid. | |

8. That method of compounding an ink in paste form, which consists of the mixing of 2 ounces of cold water and 1 ounce of white potato dextrin, heating the same slowly to a temperature of 172° F., thoroughly mixing the same, permitting the mixture to cool to approximately 85° F., at which temperature the following ingredients and their respective proportions are separately added and mixed:—

| | |
|---|---|
| Gallic acid | 336 grains. |
| Ferrous sulphate | 252 grains. |
| Hydrochloric acid | 130 minims. |
| Carbolic acid | 1½ drachms. |
| Glycerine | 2 drachms. |
| Indigotin | 68 grains. | permitting the resultant composition to be thoroughly heated to 95° F., and permitting the mixture to stand twenty-four hours.

FRANK B. COONEY.